United States Patent [19]

Becker

[11] 4,142,338
[45] Mar. 6, 1979

[54] CONSTRUCTION UNIT

[76] Inventor: Otto A. Becker, Robert-Koch-Strasse 59, 66 Saarbruecken, Fed. Rep. of Germany

[21] Appl. No.: 744,769

[22] Filed: Nov. 24, 1976

Related U.S. Application Data

[63] Continuation-in-part of Ser. No. 701,180, Jun. 30, 1976, Pat. No. 4,071,992.

[30] Foreign Application Priority Data

Nov. 24, 1975 [DE] Fed. Rep. of Germany ....... 2552586

[51] Int. Cl.² .............................................. E04C 2/36
[52] U.S. Cl. ................................ 52/173 R; 52/223 R; 52/303; 52/406; 52/576
[58] Field of Search .................. 52/127, 173 R, 303, 52/302, 227, 228, 381, 382, 576, 577, 615, 749, 223 R

[56] References Cited

U.S. PATENT DOCUMENTS

| 468,132 | 2/1892 | Dieterich | 52/227 |
| 1,053,231 | 2/1913 | Schweikert | 52/426 |
| 1,054,635 | 2/1913 | Cagnassi | 52/749 |
| 2,914,147 | 11/1959 | Millard | 52/222 |
| 3,086,273 | 4/1963 | Welborn | 52/223 R X |
| 3,201,076 | 8/1965 | Deleuze | 52/727 X |
| 3,232,638 | 2/1966 | Hollander | 52/223 R |
| 3,295,278 | 1/1967 | Muhm | 52/223 R |
| 3,325,198 | 6/1967 | Cruse | 52/426 X |
| 3,369,334 | 2/1968 | Berg | 52/227 |
| 3,567,816 | 3/1971 | Embree | 52/223 R |
| 3,803,784 | 4/1974 | Becker | 52/576 |
| 3,803,784 | 4/1974 | Becker | 52/615 X |
| 3,834,096 | 9/1974 | Becker | 52/618 X |

FOREIGN PATENT DOCUMENTS

| 2019666 | 12/1971 | Fed. Rep. of Germany | 52/173 |
| 2342049 | 3/1975 | Fed. Rep. of Germany | 52/223 R |
| 2365200 | 7/1975 | Fed. Rep. of Germany | 52/615 |
| 712519 | 7/1954 | United Kingdom | 52/223 R |

Primary Examiner—Alfred C. Perham
Attorney, Agent, or Firm—Donald D. Jeffery

[57] ABSTRACT

A wall unit having a vapor-proof evacuatable envelope and a supporting core in the envelope. Wall shells form the outer sides of the element, and screw means extend through and rigidly interconnect the wall shells and thus the element, the screw means having flanges which can be adjusted toward or away from each other to adjust the pressure applied to the wall element by the screw means. Horizontal and vertical reinforcement means are pre-stressed and cast in the outer wall shell.

17 Claims, 7 Drawing Figures

CONSTRUCTION UNIT

This is a continuation-in-part of application Ser. No. 701,180 filed June 30, 1976 now U.S. Pat. No. 4,071,992.

SUMMARY OF THE INVENTION

The invention relates to composite wall elements for walls, ceilings, and the like, and in particular for structural work above the surface and below ground level, bridges, tunnels, vehicles, cold storage houses and cold storage rooms, means of transportation, or the like.

An object of the invention is to provide a wall element having a resistance to bending so as to be capable of carrying high loads as well as having high acoustic and thermal insulation properties.

More than two wall elements can be successively connected to each other in order to satisfy various functions, in particular the bending strength or, respectively, the load-carrying capacity and the thermal and acoustic insulation. For this purpose the invention provides special connecting means by which the resistance to bending and thus the load-carrying capacity can be increased up to the limit of the strength of the material and, if necessary, sound insulating functions can be achieved by elastic tensioning and embedding on all sides in elastic seals.

The acoustic and thermal insulation can preferably be achieved by a smaller insulating wall element provided in the interior of a composite wall element and consisting of a casing which air-tightly and vapor-tightly, seals the wall element, said casing consisting, for instance, of synthetic resin material, plastic, or metal capable of carrying load. Within the hollow space, there are arranged insulating elements, preferably reflective foils, which can be aluminum, plastic with vapor-deposited aluminum or sheet metal plates capable of carrying load.

Flat and corrugated metal plates and/or plastic panels with reflecting coatings, and deformable closed-pore plastic foam plates or the like which are arranged therebetween, can also be provided, combined in groups. In particular these casings and their inserts can be tensioned in combination with outer shells or, respectively, wall elements, or parts thereof.

The inner wall element and also, if required, the hollow spaces of the outer wall element can be connected by pipes extending thereinto and having provided thereon valves with air drying devices, volume equalizing elements, air-filtering devices and especially with evacuating devices or pressure pumps and, if desired, with hydraulic pumps. In this manner it is possible to provide the interior of the wall element with dry air and/or other dry gases of any desired pressure, for instance, of a high negative or positive pressure to maintain a desired condition for an unlimited period of time. In this manner water condensation is prevented from forming on the reflecting foils upon a decrease in temperature. The vapor-tight sealing of the inner wall element by seals or the like enhances this. In order to render vapor-proof the flexible or rigid envelopes, which envelop the inner wall element, they may be multi-layer in form, or may comprise boxes. If they consist of synthetic resin foils or plastic panels or sheet metal, they can be bonded to each other in several layers, welded, pressed together, or otherwise connected to each other in a flat or profiled manner, in which case they can be provided with metallic, vapor-tight layers or they can have metal foils therebetween.

The envelopes or boxes of the inner element, if of porous material can be immersed after completion into liquid plastic material to which preferably metal powder has been added in order to achieve vapor-tight sealing. Also, metal foils or sheets can be arranged around the inner wall element in a vapor-tight manner overlapping each other. If the inner wall element is then cast into an outer wall element, any admission of air and vapor is prevented. It is advantageous to provide vapor barriers also in the outer wall element, especially towards its front wall side. For this purpose the inner sides of the outer envelopes or the outer wall shells can be connected vapor-tightly with metal foils or sheets and can be sealed hermetically.

The envelopes and outer shells can consist of several parts and can have interposed sheet metals. Such shells can be made, for instance, of concrete by pouring around such sheet metals in a mold established for this purpose. Such shells of concrete can be reinforced in order to further increase their strength and load-carrying capacity. Thus, concavely bent reinforcing irons can be cast into vertical wall parts, such reinforcement excluding an outward bulging of the wall element. In addition, the reinforcements can extend throughout the casting around the wall element, and can be interconnected in such a manner to ensure the concave bending and consequently the increased load-bearing capacity.

In order to connect the opposite surfaces of the wall element in an increased load-carrying manner, there can be arranged tensioning or anchoring screws which pass in an air- and vapor-tight manner through the inner wall element. They cause a concave bending of the surfaces of the envelopes or the shells and plates. These screws can be of several parts and screwed into each other. The heads can be adjustable and capable of being fixed in any position. Different threads can be cut on the screw spindles depending on the requirements.

Pressure differences within the housing can serve to effect movement for producing compressive or tensile stresses and for achieving support of load-carrying parts, for instance, of the wall shells or of the fixed envelopes and the inner and outer supporting elements.

Also, load-bearing supporting elements can be advantageously pre-stressed, which is counteracted by loading. Since laterally or horizontally applied pressure, due at least partially to the pre-stressing, increases with the load more than proportionately, pressures up to the limit of elasticity can be absorbed. The load-carrying parts can be kept accordingly lighter. This partial conversion of the vertical forces acting as load into the horizontal forces which increase more than proportionately with respect to the bulging component is the decisive factor.

For casting the inner composite wall element, different cast materials can be employed and connected with each other. The nature of the material depends upon the function of the wall part, for instance, the required load-carrying strength, flexible elasticity, compressibility, and acoustic and thermal insulating power. The casting in place can be effected layer-wise in time sequence with different materials and solid re-inforcing inserts, for instance, iron bars, pipes, square pipes, perforated metal sheets, perforated plastic boards, and adhesives, in such a manner that, after hardening, elements of different composite layers are formed as a whole or partially as groups or as individual elements.

The outer wall element can be cast in advance on all sides, for instance, with th exception of the surface directed towards the inside of the building. This casting can have any shape, for instance, in combination with an outer frame which encloses intermediate cavities which can also be separated hermetically from each other and can hermetically define toward the inside the hollow space for the inner insulating element. These possibilities of different shapings and developments are unlimited.

In order to receive the inner wall element or elements, corresponding recesses or hollow spaces are provided in which the wall elements are inserted.

By means of the intermediate spaces which remain, the wall elements can be arranged or cast hermetically in an air-tight and vapor-tight manner in these cavities. The casting material can be selected suitably of various types and can also consist of mixed working materials, for example, a metal alloy. In particular, it can form additional vapor-proof envelopes around the inner wall elements. The insulating properties can also be further increased, for instance, by foaming plastic foams into the insulating element. With such pre-fabricated outer wall shells the cavity surfaces on their inner side can be profiled, in particular developed in corrugated shape. They can be coated in a vapor-tight manner with reflective foils and thus can form additional radiation spaces with respect to the inner wall elements and can serve at the same time to apply linear pressure to the inner supporting elements, for instance, via anchoring bolts and atmospheric pressure.

Within these intermediate spaces horizontally and/or vertically corrugated flexible plates can be arranged. If necessary, there can be interposed on one or both sides of the corrugated plates elastic foam plates which can be pressed in a cushion-like manner into the corrugations so as to take up pressures.

The surface of the inner wall element located towards the inner side of the building can, after appropriate sealing of the edges of the inner wall element, be cast or also foamed in place. Instead of casting, a load-carrying cover plate with an outer layer of plaster can be provided, having towards the inner element a polished, reflecting, and vapor-proof surface, for instance, a corrugated plate, trapezoidal plate, a flat metal plate or a plastic plate, provided if desired with additional coatings.

The cavity of the outer wall element is provided with a vapor-tight aluminum lining on all sides and, after introduction of the load-carrying insulating element, is preferably also provided with a vapor-proof rigid or flexible or stiff envelope. The cavity can be sealed in a vapor-tight manner, e.g. filled with a dry gas under a suitable pressure, that is, positive or negative pressure or a vacuum. A positive pressure can be exerted also by a liquid. Radiation spaces, for instance, horizontal radiation chambers, can be formed by spacer strips. The introduction of the insulating element into the evacuated cavity of the outer wall element makes possible a completely pressure-free arrangement of the insulating element, by which the heat conduction through the invidivdual parts of the insulating element which are in contact with each other can be substantially reduced.

If the vapor-tight closure is assured for an unlimited period of time by the covering or the box of the inner wall element and in addition by the outer wall element and its cavity, the wall element, before it is closed, can be filled with a dry gas of predetermined negative or positive pressure or be completely evacuated, and the closing can be effected in a pressure or evacuation space. In order to avoid the oxidation of reflective metal surfaces, it is advantageous to provide them with a layer of polyethylene of a thickness of less than 0.1 mm.

The building element is preferably formed with at least one disk which is formed of cap bolts, the heads of which rest against the outer walls of the buidling element and the inner ends of which are connected by a thread arranged within the interior of the insulating elements. In this connection, the length of thread is such, and flanges are so arranged on the cap bolts, that, upon the tightening of the two spindle parts, the anchor bolt or its flange rest against the covering or the walls of the insulating elements. By means of the anchor bolts, an increased compressive strength of the building element is obtained transverse to the longitudinal axis of the anchoring bolt. At the same time, the walls of the insulating element are maintained an exact distance apart from each other.

DESCRIPTION OF THE PREFERRED EMBODIMENTS

Figure 1:
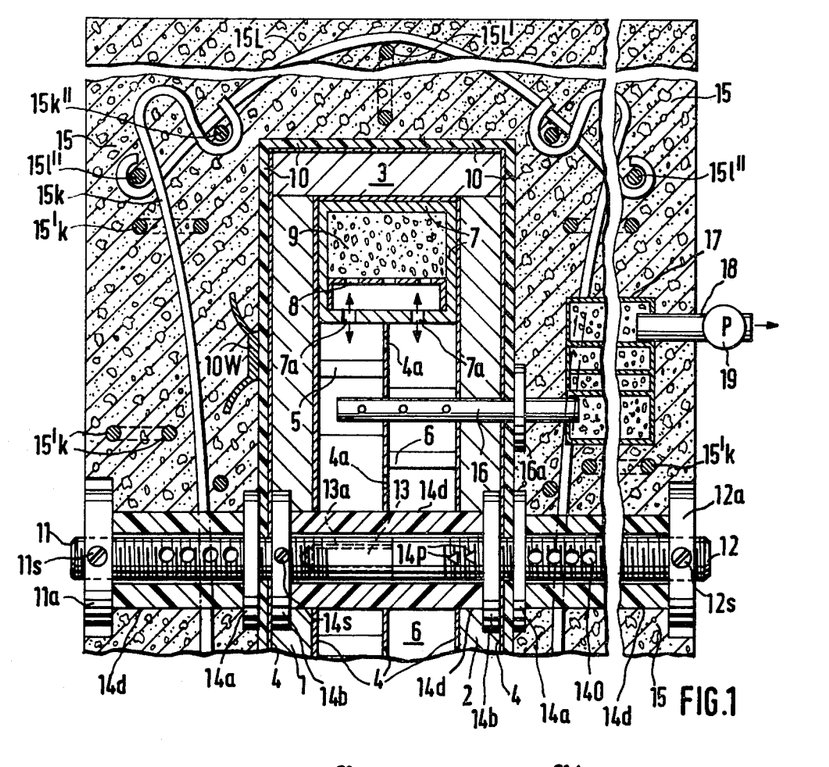
FIG. 1 is a fragmented vertical cross-sectional view through one of the forms of the invention.

FIG. 1 is a cross section through an upper part of a composite wall element consisting of the combination of an inner smaller wall element which serves for thermal insulation and which is enclosed on all sides in air-tight and vapor-tight manner by a covering 10 of synthetic resin or plastic material. An outer wall element 15, for load-bearing and compressive strength, is cast around the inner wall element 10 and consists of any suitable maerial, for instance, concrete, cement or plastic.

The covering 10 is made reflective on its inner side or is coated, for instance, with a foil 4 of plastic with aluminum vapor deposited on both sides thereof, in order to assure the vapor-tight closure. For the shaping and stiffening of the covering for load-bearing purposes, plates 1, 2, 3, for instance, of metal, wood, plastic, rigid foam, cardboard, or the like, are arranged around all the inner sides of the covering 10, the plates being reflective towards the hollow space of the wall element thus formed as a result of reflective foils 4 or coatings applied to them. These reflective foils may be, for instance, aluminum foils or plastic foils with aluminum coatings vapor-deposited thereon.

The coverings 10 themselves may consist of any flexible or rigid material, depending on function. In particular, they may consist of a composite with other materials, which are combined with each other, for instance, by bonding. The shaping may be multipartite, for instance, with intermediate sealings, as described below.

The structural element is traversed by at least one two part anchor bolt 11, 12, the two parts 11, 12 of the anchor bolt being connected with each other by a tapered thread 13 on the part 12 which can be screwed into an inner mating thread 13a of the part 11.

On the outer wall of the covering 10, flanges 14a are arranged on the anchor bolt 11 and also on the anchor bolt 12, and flanges 14b on the inside of the covering 10. The outer flanges 14a, resting against the covering 10 form at the same time the bolt heads for the spindles which pass through the inner wall element.

The outer flanges 14a can be arranged firmly on the bolts 11 and 12 so as not to be displaceable in a given position, for instance, by welding. Another possibility consists in providing bore holes 140 in the screw spindles 11 and 12, into which holepins or protruding head bolts can be placed which prevent the flanges from being shifted, at least in the direction towards the anchor heads 11a and 12a. Instead of or in addition to this, annular grooves can be cut into the spindles 11, 12 at predetermined places and the flanges can be inserted therein, for instance, by means of radial cuts in the flanges. If the hole in the flanges 14 corresponds to the diameter of the spindle, protruding resilient split rings can then be inserted into the grooves on both sides of the flanges. The intermediate flanges are prevented from any shift in position by the rings which limit then on both sides and act as stops. Thread cuts are made on the screw spindles and can extend in the same direction or in opposite directions for the moveable arrangement, if desired, of the flanges 14a, 14b which in each case bear corresponding mating threads. It is also advantageous to arrange the anchor heads 11a, 12a of the anchor bolts in detachable manner, for instance, with internal threads such as nuts, but nevertheless in lockable fashion, so that they can be screwed on and off and fixed in the desired end position, for instance, by means of small radial screws 11s, 12s. These small screws can extend through bore holes provided at small distances apart from each other.

The spindle flanges 14a, 14b can be arranged at a desired distance apart, so that in the end position they rest firmly against the outer walls of the covering or wall. Thus they assure a very specific distance between the coverings 10 or covering walls 10 against which they rest. For this purpose, for instance, the fixing of a given thread length can also be used. In this way the inner wall element is protected from an excess of pressure or static stress being pressed inwardly in the direction of the longitudinal axis of the anchor bolt. On the other hand, it is also possible, if necessary, to exert a predetermined pressure on the inner wall element and its inserts by the screwing together of the anchors 11, 12 by means of their threads 13, 13a.

It may be sufficient to provide a thread for the screwing on of the flanges 14a only on the spindle parts which are located outside of the covering. From the length of the thread the possibility results of use for wall elements of different depth dimensions which are to be pressed against each other by the flanges 14a.

As shown by FIG. 1, there are loosely arranged on the inner sides of the covering 10 on threads directed in the same direction, i.e. on the extended threads from the anchor heads, opposing flanges 14b. The flanges 14b are stopped at their end position on the spindles towards the inside of the covering by screws 14s which are tightened against the spindles 11, 12, and thus, by the pressure which they exert, connect the flanges 14b firmly at the intended place to the spindle. For this purpose, there can also be provided corresponding bore holes 140 on the spindle into which these screws engage with their ends. Grooves can also be cut at successive places in the corresponding regions of the spindles and the flanges 14b can thus be fastened in longitudinal direction by engagement of the screws into these grooves.

FIG. 1 shows another possibility for positioning the flanges. For the right-hand flange 14b there are arranged resilient triangular locking elements 14p which have an oblique plane in the direction towards the screwable spindle end part 13. If the flange 14b is pushed, coming from the thread 13, onto the spindle 12, these triangularly broadening oblique elements 14p will be pressed down elastically against springs within this spindle so that the flange 14b can be pushed over it. Since the triangular locking elements have a flat triangular base which is developed perpendicular to the surface of the spindle and against which the flange 14b can lie flat, the flange 14b is prevented from changing its position back against this locking element. This is of importance when the wall element or its cavities are to be widened by displacement of its wall parts in such a manner that it is possible jointly to evacuate all chambers, cells, and other cavities from one point. If the spindle parts 11, 12 are screwed apart, the cover parts 10 are pressed outwardly by the flanges 14b. In this way there is produced the necessary evacuation slot. Such locking stop elements 14p can be arranged at all places on the spindles, particularly in the case of building elements having a plurality of partition walls, coverings, and the like, the movement of which is required. This may also be necessary in order to compress an intermediate space by widening the spaces arranged on both sides thereof.

A blocking of the flanges 14b is necessary with an arrangement of the thread in opposite direction. With the countercurrent arrangement of the thread, the two flanges 14a, 14b move further and further apart upon the reverse movement, i.e. upon the partial turning outwardly of the connecting thread 13. This is not possible, however, if the inner flange 14b is stopped either by such elastic blocking means, or by pins which engage in bore holes, or by screws which extend radially through the flanges. In such a case, the flange would have to turn with the spindle and not axially relative thereto.

If the flange 14b has a thread and if it is firmly fastened to the covering 10 or the partition wall, then the wall must move or bend either inwardly or outwardly corresponding to the direction of the thread or the direction of the actuation of the spindle.

The provision of the locking elements 14p has the advantage that, with the rotation of the flange 14b on the thread, the locking takes place automatically in the intended position which is to be assumed upon the termination of the rotation of the flange 14b. For reasons of assembly, this may then be particularly advantageous if it is not possible to insert locking pins or to provide screws.

The coverings can bear horizontally firmly arranged pins or the like vertically on their surfaces directed towards the flanges 14b by means of which they can engage into corresponding perforations in the flanges. In this way, depending on the length of these pins a connection is produced during a certain rotation of the spindle between covering and flange. Then the flange must move in the longitudinal direction of the spindle corresponding to the rotation thereof. This displacement may serve either for evacuating the air or for other purposes, for instance, for the production of pressure by adjacent load-bearing supporting elements or the like.

There may also be instances in which a different pitch can advantageously be employed on the thread 13 with respect to the pitch of the flanges 14a, 14b. The flatter the thread, the stronger the pressure which can be exerted by the flanges. Different thread pitches in the different regions make it possible to move with the same number of revolutions over different lengths of paths of the walls and, temporarily or in final manner, to change the distances from the adjacent partition walls and shells which are also simultaneously moved.

The advantage of the arrangement of the flanges on threads within given regions of movement is a precise possibility of adjustment, as desired, of the distance from the other opposite flanges 14a, 14b and thus the assuring of the intended functions. The coverings can bear, around the holes through which the spindles are pushed, guides which can widen as desired on both sides, consisting of correspondingly thick rubber disks, rings, pipe lengths, or the like which are glued thereon. In this way in case of contrarotating threads there is obtained a correspondingly hermetically sealed play for the variability of the final position of the flanges. The same anchor bolts can in this way be used for differently dimensioned inner wall elements. Between the inner flanges 14b there can preferably be provided fixed spacer sleeves 14d, for instance, of insulating material such as plastic, the ends of which press themselves into highly elastic seals, for instance, of rubber, which may be arranged on the flanges 14b, or in case of larger diameter, on the covering 10. When the spindles 11 and 12 are screwed together, the bolt passage is closed off towards the rest of the cavity of the inner building element. By the dimensioning of said sleeves 14d a predetermined spacing of all flanges 14b can be maintained and thus the corresponding depth direction of the inner wall element in the end positions can be kept uniformly flat. Furthermore, these sleeves 14d serve as additional pressure-resistant supports in the direction of the spindle axis. If the sleeves are made of rubber, they can also contribute to the acoustic insulation.

An air-drying device 7, 7a, 8, 9 can be provided in the upper part of the inner wall element. The venting and pressure regulating of the inner wall element can be achieved by a drying device 16, 17, 18, with valve 19. In this way, the inner structural element can enter into communication with the outer atmosphere or a pump unit, without water vapor being able to penetrate into the inner element. The pipe 18 can also be connected with, for instance, a volume equalization device so that the same pressure is always present within the wall element as outside of it. The valve 19 can be adjustable so that a given pressure, positive or negative, can be maintained in the interior. In particular, the pipe 18 can be connected to an evacuation unit and by suitable adjustment of the anchor bolts, for instance, by providing an appropriate length of the thread 13 and of the spacing of the flanges 14, the evacuation of all hollow spaces can be effected from a single point.

The wall element itself and all parts which lead into the inner wall element, are sealed off in air- and vapor-tight manner by corresponding sealing means, and all walls of cells, chambers, and other hollow spaces are preferably insulated in vapor-tight manner on all sides by a reflective development or coating.

FIG. 1 shows in the outer cast layer, in order to provide an increased load-bearing function, a vertical reinforcement 15k and a horizontal reinforcement 15'k. These reinforcements are bent concavely toward the inner wall element. They are directed opposite the preferably similar concave reinforcements present on the other side of the wall element. This applies both for the vertical as well as the horizontal reinforcement. Even in the case of extremely high pressures, the outer cast layers can thus not bulge outwardly.

Additional reinforcements 15k'', 15l, 15l' and 15l'' are also cast into the outer layer 15, positioned so that the curved ends of reinforcements 15k and 15l either extend over or engage around certain of these reinforcements so as to achieve the prestressing desired.

The anchor bolts can be made of any suitable material, depending on the requirements. The same applies also to the flanges, as well as to the sleeves 14d. Thus they can consist, for instance, of a metal alloy which is of poor heat conductivity, such as of iron with an about 30% to 40% addition of nickel, or of plastic or of some other material resistant to pressure or to tension.

Instead of dry air, another gas of poor heat conductivity, for instance, dichloro difluoro methane or sulfur hexafluoride, can be introduced in the wall element in dried condition at a negative pressure. A negative pressure or vacuum results in a favorable pressure action by the atmosphere on the outer cast structural parts 15. These parts are thereby pressed concavely from both sides towards each other or towards the intermediate inner wall element. Due thereto the lateral supporting of load-bearing elements arranged in between is increased.

If such a structural element is pressed together in part by the atmospheric pressure and in part also by firmly tightening the screwable anchor bolts 11a, 12a after the casting has solidified, then the vertical actions can increase the stresses only in a direction concavely towards each other. As a result of the increased concave bending towards each other, an increased horizontal opposing force, acting laterally on the load-bearing supporting elements, is produced that corresponds to the increase in the bulging components. By the reinforcement described above with vertical and horizontal reinforcement members directed concavely towards each other or, for instance, with reinforcement sheets, such wall elements can compensate over-proportionately in horizontal direction, upon increasing load in vertical direction, in a rupture-proof manner for the horizontal bulging component which develops. For protection during the casting, the outer spindle parts are covered with protective coverings, for instance, with sleeves 14d, lengths of pipe, or parts of hose, which are arranged permanently or can be removed subsequently and replaced by other means.

The supporting opposing forces increase to a greater extent than the bending component which is formed from the increasing load. If metal sheets are used for the reinforcement, they should preferably be perforated in order to make possible the coherence of the concrete layers. Such reinforcements or reinforcement sheets can be strengthened, for instance, by square iron bars or they can be profiled.

FIG. 1 also shows honeycomb plates 5 and 6 with interposed reflector means 4 which can be load-bearing supporting elements as, for instance, plates 1 and 2, which, as shown, extend to the upper horizontal bearing plae 3. These supporting elements can be composite elements consisting, for instance, of a plurality of pipes arranged spaced alongside of each other, particularly square pipes which are surrounded in an air- and vapor-tight manner on both sides by metal sheets and can be fastened to said sheets, for instance, by welding, cementing, riveting, or the like.

Other supporting means can also be provided, for instance, square or round pipe lengths arranged horizontally between the vertical square pipes by which the distance of the vertical pipes from each other is assured and a lateral bending of the pipes is precluded, even in case of great load on the vertical pipes. The metal sheets arranged on both sides of the vertical pipes are supported by the honeycomb plates 5 and 6. This can be effected not only by the anchor bolts 11, 12 and/or the atmospheric pressure, but also from both sides by a concave prestressing of the vertical outer walls of the wall element by means of stressed cast-in-place reinforcements 15k, 15'k. For this purpose, the reinforcements, prior to the casting, are introduced not only bent into the casting mold but also by special tensioning means which may possibly also be cast in place. Thus, for instance, the concave curved reinforcements 15k, 15'k may be cast in flatter position, stressed elastically by tensioning means. Thus they have an increased opposing force as soon as a force attempts to deform them in convex direction.

The honeycombs should advantageously be selected in such a size that their webs bridge over the distances between the pipes. The space between the metal sheets in which the pipes are located can be evacuated and in this manner, if an atmospheric pressure or a positive pressure prevails in the inner wall element, an additional higher pressure or tension can be exerted on the sheet metal walls and intermediate pipes in order to increase their resistance to bending and their load-bearing capacity.

The horizontally arranged pipe lengths mentioned can be arranged laterally to the vertical pipes, and disks cemented or welded to the vertical pipes laterally, corresponding to the inner diameter of the horizontal pipes. The disks then enter in air-tight manner into the pipes which are arranged in between and thus fix their position.

Instead of square pipes there can also be arranged between such composite sheets vertical corrugated plates, for instance, trapezoidal sheets or corrugated sheets. Instead of pressing by honeycombs the surrounding composite sheets from the outside, this can be done, for instance, by horizontally corrugated plates, particularly corrugated metal sheets. This has the advantage that under the pressure which acts on them, deformation of the undulations by flattening takes place or, if this is not possible, an increased tensioning takes place whereby a stretching of such horizontally corrugated sheets occurs. In this way, the bending strength and the load-bearing capacity are further increased. These horizontal corrugations which are placed under tension by the lateral pressure provide increased support, for instance, horizontally, for the interposed load-bearing supporting elements.

These stresses can be increased and act horizontally on the adjacent supporting elemnts, concentrated at individual lines of contact, so that in this way a further opposing force is developed against a pressure which increases with increasing load. Gases, rather than liquids, can also be used for exerting the pressure.

In addition to the stress forces exerted on the load-bearing supporting elements horizontally and vertically over the horizontally corrugated intermediate plates, a high hydraulic pressure can be exerted on all sides upon all walls in the hermetically closed hollow space in which the vertically corrugated plate is located, and in this way not only are the vertically load-bearing supporting elements additionally supported against bending in order to take up even higher loads, but, at the same time, a high pressure action is exerted on the upper cover which, by corresponding connection by bolts with the vertical load-bearing parts of the wall element, produces a tensile stress on the latter in vertical direction and results in a stretching, which additionally counteracts lateral bulging upon the action of this stress.

The bending strength is thus produced in two ways, on the one hand by horizontal pressure and on the other hand by vertical tension.

The increased resistance to bending by stretching the supporting elements, e.g., the load-supporting square pipes, can be produced in advance by the production of a tension of any desired value in vertical direction in pipes whose function is to produce the load-bearing capacity of the wall element.

Figure 2:
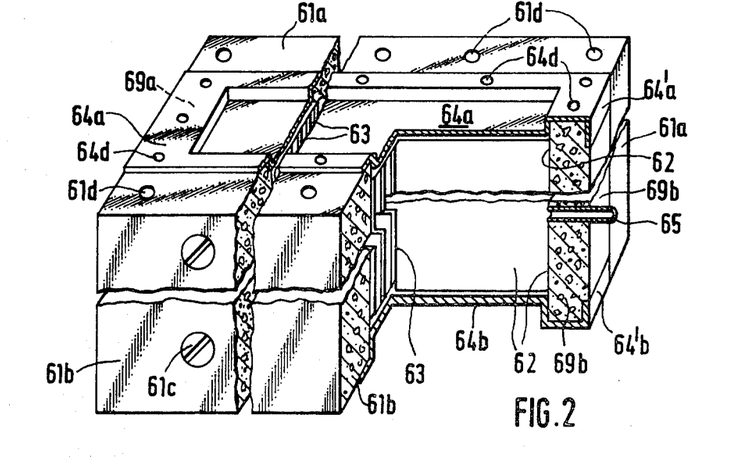
FIG. 2 is a fragmentary, perpsective view of a modified wall element form.

FIG. 2 shows a wall element, preferably as a building block, consisting of at least two shells 61a, 61b, spaced from each other and consisting of load-bearing material, e.g. slabs of cement, concrete, clay, plastic, and/or suitable materials combined with each other in composite character. The load-bearing materials are formed jointly with side walls 69a, 69b which are preferably of material of poor heat conductivity, for instance, plates, covers of plastic, synthetic resin, foamed materials, and the like, which vertically surround a hollow space which can be closed off in air-tight and preferably vapor-tight manner on top and on the bottom by cover plates 64a, 64b of material of poor thermal conductivity, such as plastic slabs.

The side walls 69a, 69b have the function of limiting the heat conduction from the outer wall 61 to the inner wall 61b to a minimum. For this purpose, the thickness of the material of poor heat conductivity can also correspondingly be determined. The vertical walls of the element can be connected to each other directly or by seals.

For fastening the different parts to each other, screws, bolts, pins, clamps, and the like may be used which extend, for instance, through correspondingly provided holes and the like. All walls of the hollow space are coated or otherwise developed in a hermetically insulating and particularly reflecting manner. For insulation, foam plates can be arranged, for instance, on the inner surfaces of the hollow space, for instance, by bonding. Reflective foils, of aluminum, or plastic with vapor-deposited aluminum, can be arranged on such insulated plates, for instance bonded thereon and/or clamped in whole or in part thereon. In this way the hollow space can be sealed off in a reflective manner on all sides. The cover plates 64a, 64b also are provided on the inner side of their cavity with correspondingly suitable insulating and/or reflective layers. In the hollow space itself, there is preferably elastically resilient, upright or stressed reflective foils, panels, or metal sheets or swingable plates provided with a reflective coating, for instance, of plastic or synthetic resin. Such foils, and in particular thin plates, can be tensioned as a whole or can be subdivided in a manifold tensioned manner by interposed springs or by other elastic tensioning means in order to absorb sound. By a hanging or vertically tensioned arrangement, there are imparted to the foils natural frequencies which enable them to absorb resonance vibrations. The arrangement is highly elastic on all sides and permits a considerably broader resonance spectrum than a rigid attachment of the edges. The foils or panels can be arranged in a multiple staggered arrangement one behind the other and, in accordance with the stresses imparted to them, achieve the absorption in predetermined regions of the acoustic spectrum. In this way, low-frequency vibrations can also be taken up as membrane vibrations. In combination with associated additional sound-absorbing means, for instance, with interposed closed-pore foam layers which can be completely surrounded with, for instance, stretched foils, the oscillations are converted into irregular molecular thermal movement. The interposed foam layers can be arranged under elastic tension, for instance, over the foils surrounding them. Foils, panels, and metal sheets capable of vibration can be arranged vertically upright on highly elastic, for instance, ribbed bottom supports.

In order to maintain their vertical position they can be deformed in suitable manner vertically and/or horizontally and can be stiffened. Accordingly, the vertical edge parts can be bent, for instance, in zigzag shape, whereby a uniform development of the surface in vertical direction is effected. By elastic spacer means arranged especially on the upper and lower edge parts, for instance, by interposed foam strips, a uniform parallel development of the surface with respect to the following foils can be achieved in horizontal direction. It may be advantageous to provide the edge portions of the foils with reinforcing means.

The outer parts of such a structural element can advantageously be connected with each other by the cover plates 64a, 64b which lie on the upper and lower horizontal edge surfaces of the plates 61a, 61b, and 69a, 69b and are connected to these vertical wall parts. Furthermore, they can hold said parts in their position and reinforce them at least on two sides, preferably on the sides 69a, 69b which shall close them off in insulating fashion, by means of vertical bends. By a suitable inward bending there is achieved a U-shaped embracing. In the same manner, the front and rear plates 61a, 61b can also be embraced so that the two cover plates 64a, 64b cover the structural element in its entirety, embrace it, seal it off in vapor-tight manner, and uniformly distribute the pressure acting thereon. For connecting the front and rear structural panels 61a, 61b and for exterting pressure, anchor bolts 61c are passed through the hollow space or through the side walls 69a, 69b in suitable number.

For air-tightly closing off the holes, corresponding sealing means, for instance, sealing disks, are provided for the screws between nuts and the inner and outer flanges and shells. The same applies in particular to screws or bolts which extend into the hollow space of the wall element, for instance, through the lateral load-bearing walls 69a, 69b. It is possible to provide the inner hollow space with a negative pressure or vacuum by which it is possible to improve the bending strength and acoustic insulation.

As shown in FIG. 2, the upper and lower cover plates 64a, 64b of the wall element have depressions. These depressions serve not only for the U-shaped embracing and connecting of the vertical structural parts but also for the insertion of insulating connecting plates, for instance, of rigid foam plastic, which are preferably enveloped by vapor-proof foils. In this way, the exact position of the building blocks to be placed one above the other is assured. Continuous holes from the top to the bottom can be provided in the vertical walls through which bars are inserted, for instance, bars of plastic material. In this way the building blocks which are stacked one above the other are accurately and firmly connected with each other to form flat inner and outer overall walls.

The arrangement of the cover plates 64a, 64b in connection with wall elements or building blocks makes it possible to connect the superimposed hollow spaces of the building blocks. It is then possible to insert larger foils in tensioned condition, for instance, arranged on suitable frames, in a larger total hollow space formed in this manner.

In the preceding and succeeding hollow spaces enclosed by further building shells, pressure differences can be produced. The variation of such pressures is advantageous for the bending strength and thus the load-carrying capacity of such building elements and their combinations. For this purpose the lengthened anchor bolts 61c can extend through further head and end parts, and also through the associated wider hollow spaces and additional outer walls and can bear further flanges, nuts, and sealing means, for instance, spacing and sealing sleeves.

FIG. 2 shows a pipe length 65 for evacuating the building block. In this way communication can also be achieved with adjacent building blocks for ventilating with dry air or dry gases.

Figure 3:
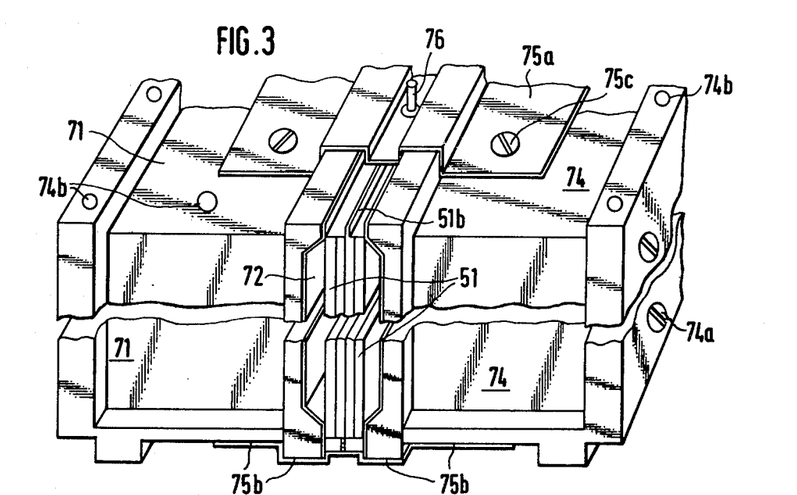
FIG. 3 is a perspective, fragmentary view of a composite building block.

FIG. 3 shows, in perspective view, a similar wall element in the form of a composite building block. This composite building block consists of a front block 71, a gap 72 in which insulating inserts are arranged, and block part 74. The gap 72 is provided in the full height and width of the building block parts so that the insulation provided therein thermally and acoustically separates the blocks from each other. This gap is closed in air- and vapor-tight manner at its upper and lower openings by profiled cover plates 75a, 75b of insulating material. Such cover plates can consist, for instance of plastic. The corner parts can be closed also in vapor-tight manner by adhesive strips, for instance, of aluminum foils. In this way the gap is closed off hermetically in vapor-tight manner on all sides.

What has already been stated with regard to the insulating inserts 62, 63 in FIG. 2 applies also to the insulating insert designated by the reference numeral 51 in FIG. 3. The inner walls of the gap 72 are also covered on all sides with insulating and reflecting layers. A layer of closed-pore plastic foam can be bonded to the inner surfaces and can bear aluminum foils which reflect towards the free space of the gap. The bonding of insulating means to the block surfaces of the parts 71 and 74 can be effected at individual points or over the entire surface, depending on whether the ability of vibration of such parts is to contribute to the acoustic insulation.

The parts 71 and 74 are profiled similar to the cover plates 64a of FIG. 2 to make possible the positioning of intermediate layers of insulating plates between the upper and lower surfaces of the blocks.

The front block part 71 is connected with the rear inner block part 74 by the upper and lower cover plates 75a, 75b and by means of screws 75c. As a result of these and correspondingly profiled lateral vertical cover plates (not shown), such a building block forms a firm unit.

Anchor bolts 74a are preferably provided extending through the entire building block. By the pressure which they are able to exert in predetermined manner, seals, for instance, rubber plates, can seal off the gap 72.

Vertical holes or recesses can also be provided in the outer block surfaces 71 and 74 permitting a connection of the stacked blocks by the passage therethrough of corresponding round bars of metal or plastic or the like, in order to secure the arrangement of the blocks one above the other.

The air gaps can be in communication with gaps arranged alongside of and/or above each other by pipe lengths 76 or openings.

Figure 4:
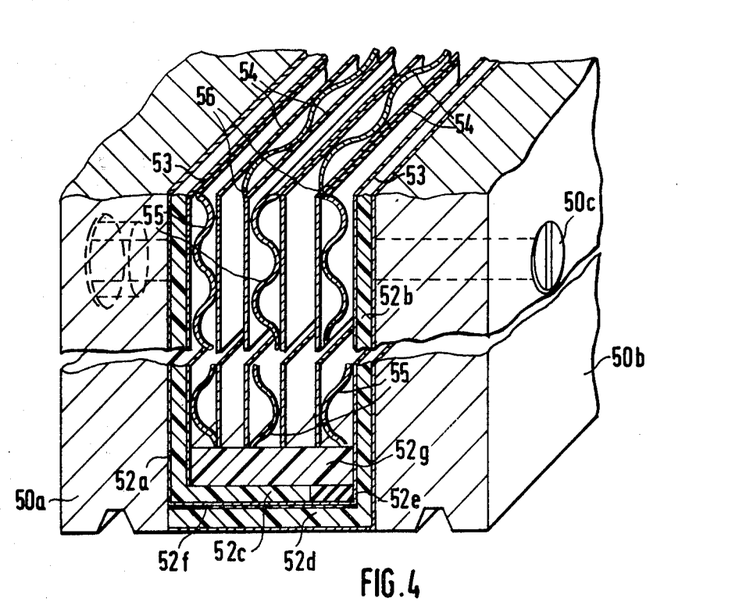
FIG. 4 is a perspective view, fragmentary and partially cross-sectioned, of a still further modified form of the invention.

FIG. 4 shows another wall element consisting of an outer shell 50a, preferably of pressure-proof, load-bearing, inorganic building material, for instance, cement, concrete, clay, or the like, and also a compression-resistant, load-bearing shell 50b of approximately similar type, arranged at a distance therefrom.

In the space between these two shells there is arranged a box-like, bipartite body preferably of insulating material, for instance, synthetic resin, plastic, aluminum sheet, or the like. The horizontal flanges 52c, 52d of the vertical box parts 52a and 52b, respectively, are arranged displaceably in one another against seals 52e and intermediate seals 52f, as well as inner sealing inserts. In the hollow space between parts 52a and 52b there are arranged thermal and acoustic insulating elements, particularly ones with reflective surfaces. For this purpose, reference is had to the insulating inserts as they have already been described in the preceding examples of embodiments. Panels 53 and 54 are arranged with or without tension in load-bearing manner, for instance, by means of edge bends or zigzag edge profilings between elastic, insulating, vibratable sealing strips 52g. This can be done in such a manner that the width of the plates is maintained larger in a predetermined amount corresponding to the desired difference in degree of tension, than the width of the space. In this way, there are produced predeterminable natural frequencies. Between these flat reflector plates 53, 54 there are arranged horizontally and vertically corrugated plates, panels, foils, or the like 55, 56, which are upright and standing, with or without tension. In particular, vertically corrugated plates can thus be inserted. The outer block parts 50a, 50b are connected with each other at a predetermined pressure and spacing, by means of anchor bolts 50c which pass through the box-like body. For this purpose the spindles bear, in the inner boxes 52a, 52b or covering, threads, preferably opposing. The flanges secure the distance apart so that the inner element cannot be changed even under a higher pressure of the outer anchor heads or of the tensioning bolts. The predetermined pressure exerts an intentional deformation on the corrugated reflector plates, which deformation, insofar as it cannot act through the upper and lower as well as lateral limitations, achieves a static condition of stress in vertical as well as in horizontal direction of the corrugated intermediate plates 55. In this way, the block is made of increased load-bearing capacity. These stresses are at the same time of advantage for acoustic insulation by the formation of natural frequencies. In order to be able to reflect vibrations at the edge parts as elastically as possible in the same phase, circumferential, highly elastic sealing strips 52g are preferably provided.

Between the flat plates 53, 54 and the corrugated plates 55, 56 there can be provided further insulating means, for instance, profiled and particularly cross-wise ribbed plastic foam plates (not shown), the ribs being so arranged with respect to the corrugated plates that they intersect the same.

By the stacking of the flat and corrugated plates one behind the other and by the stress imparted to them, for instance, via the anchor bolts 50c, the closed-pore plastic foam layers are pressed in cushion-like fashion into the chambers formed by the corrugations. These cushions are preferably coated on all sides with reflective foils, for instance, aluminum foils, so that these foils also are tensioned in the same manner as the foam foils or plates and have natural frequencies to take up resonant oscillations. The plastic foam plates may be of different thickness and different density and thus elasticity. By these different embodiments, predetermined ranges of the acoustic spectrum can be covered and the corresponding frequencies absorbed as body vibration and then converted into molecular heat movement.

Thus a high acoustic insulation can be achieved with such building blocks as well as with wall elements. For heat insulation, all hollow spaces and the closed-pore foam plates are reflectively enveloped on all sides. For a further increase in the reflection, thin wrinkled foils of aluminum can be introduced into the hollow spaces formed by the corrugations, particularly in large chambers and cells, by means of which air convection is impeded and the infrared rays are diffused in all directions with the formation of interference. Plastic foam beads of special plastic which can be coated in a vacuum with aluminum, may also be put in. Glass fibers or glass wool, preferably coated with aluminum in a vacuum, can also be introduced into large chambers, the direction of the reflecting glass fibers being preferably the same as that of the flat plates. As a result, the glass fibers extend transversely to the passage of sound and heat so that the absorbed energy is deflected in transverse direction to the direction of passage. The insulating element between the block parts can be provided with a negative pressure or a vacuum, whereby the strength of the composite unit and the acoustic insulation is improved.

The load-bearing capacity of the building block is also increased by incorporating into the inner element corrugated plates. The inner stresses in horizontally and vertically corrugated plates result in an increased lateral as well as increased vertical support. The embodiments described hereinbefore can also be employed in the other illustrative examples of embodiments.

Figure 5:
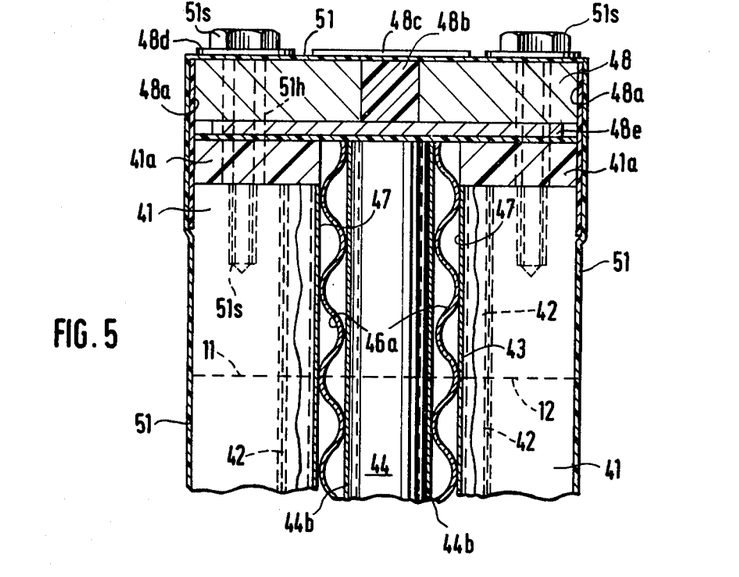
FIG. 5 is a vertical cross-sectional view of yet a further wall element modification.

FIG. 5 shows an inner wall element surrounded in air- and vapor-tight manner by a covering 51. The wall element is suitable for composite wall elements as well as for building blocks as the inner element thereof. It consists of two preferably load-bearing insulating supporting elements 41 which are arranged spaced from each other. The inside vertical surfaces 42 thereof are profiled in undulated shape and reflectively coated, for instance, with reflective foils 43. Between the two supporting elements is arranged a composite supporting element consisting, for instance, of pipes 44 or bars, preferably square pipes, arranged at pre-determined distances apart in a row (one behind the other in cross-section), preferably with cylindrical bores which are surrounded on both sides by reflective, pressure-resistant, load-bearing metal sheets 44b to which they are fastened. Round pipes which are inserted into square pipes can also advantageously be employed. This composite supporting element of pipes and lateral cover sheets is preferably closed in air- and vapor-tight manner on all sides.

On the side of the cover sheets 44b there are arranged corrugated reflective sheets 46a which contact both the cover sheets 44b and the vertical profilings of the supporting plates 41. Through this inner element 41, 46a, 44, 46a, 41 there are extended anchor bolts 11, 12 (shown schematically by line 11, 12) which exert a pre-determined pressure or tension on the supporting elements 41, as a result of which the latter are pressed against the horizontally corrugated plates 46a, thereby producing therein both a vertical load-bearing as well as a horizontal supporting stress. In this way, the composite supporting element 44 is supported in bending-resistant manner from two sides. In lateral direction the pipes can be supported, for instance, by anchor bolts extending through the pipe spacings or by spacer means in the form of horizontal transverse pipes.

If the space in which the perpendicular corrugations 44a are located is evacuated, atmospheric pressure bears on the cover surfaces 51 and effects a concave inward bending of the inner wall element from both sides. Above the outer supporting elements 41 there are arranged elastic circumferential sealing strips 41a above which there is arranged a pressure plate 48e and a circumferential plate 48 in the center of which is mounted a preferably elastic seal 48b. Bolts 51s extend through plates 48, 48e, and 41a into the supporting elements 41. The bolts are surrounded in the plates 48, 48e, and 41a in air-tight manner by sleeves 51h. By tightening the bolts, the supporting elements 41 are stretched and placed in tensile stress. This is made possible by the elasticity of the circumferential seals 41a which can be pressed together upon the stretching and by the supporting of the pressure which the bolt heads of the bolts 51s exert on the load-bearing composite supporting elements 44 by their counteracting stress. The stretching of the outer supporting elements 41 with simultaneous compression in a horizontal direction by the anchor bolts 11, 12 against the corrugated plates 46a and the composite supporting element 44, 44b produces a high resistance to bending as well as a high load-bearing capacity of the inner wall element. The stretching tension counteracts a bulging. The anchor bolts impart a predetermined concave bend to the wall element. The load pressure, therefore, produces an increased concave tensioning of the supporting elements 41 directed against each other and thus a more than proportional supporting of the composite supporting element 44, 44b. The structural shells of the outer wall element act likewise. The cover 51 may consist of flexible, firm or stiff material. The joints can be closed off towards the outside in advance by adhesive sealing strips 48a. For better distribution of the load a pressure joint 48c is arranged above the composite supporting element 44, 44b and the elastic seal 48b.

Figure 6:
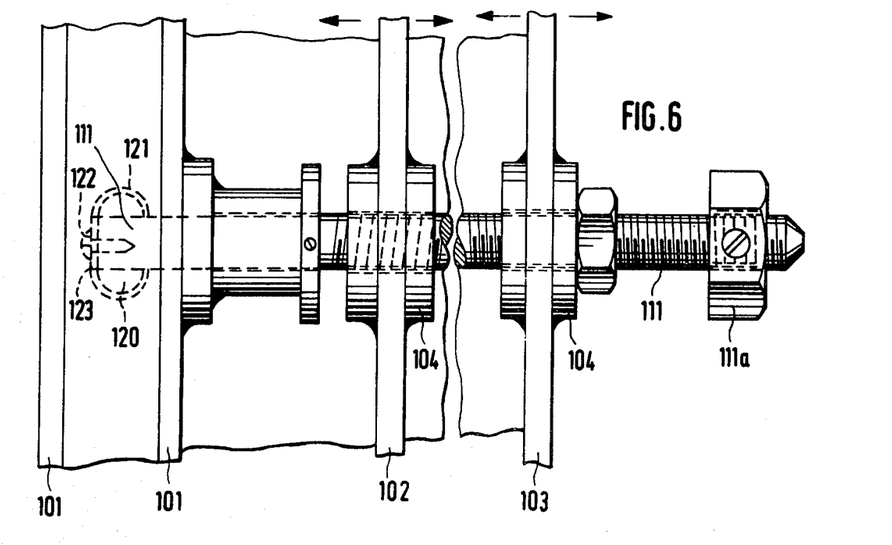
FIG. 6 is a fragmentary, front elevational view of a screw assembly used in accordance with the invention.

FIG. 6 shows a screw spindle 111 having a foot 111a and a locking ring 120 fastened thereon, which is encased detachably by a corresponding housing 121 by screw 122 and cover plate 123 positioned in the composite wall 101. The spindle 111 can therefore not shift in the longitudinal direction. The partition walls 102, 103 have accompanying disks 104 welded around the passage openings or reinforcement strips with mating threads are applied to the spindle. The spindles, depending on the direction of the thread cuts, can be screwed into said mating threads after complete evacuation of the intermediate hollow spaces. This is done by simple turning, by means of which the shells 102, 103 are simultaneously moved. For this purpose, the spindles may have, within the regions entering into consideration, different and preferably increasing diameters and bear threads of different pitch and direction of thread. This can precisely be determined in advance, and thus all functions to be performed by the shells in their permanent end position can be achieved simultaneously and jointly by means of the corresponding screw movement.

Instead of the stepwise increase in the diameters of the threads, pipe lengths of correspondingly larger diameter can also be fastened on the spindle. Such pipe lengths can be placed one behind the other on a smooth spindle and, by the nature of their attachment, for instance, by slots which push themselves onto pins which extend transversely through the spindle, can rotate with the spindle. The threads can be provided on these pipe lengths so that the shells, partition walls, or the like arranged thereon carry out the intended movements in the manner necessary. Thus, by a greater thread pitch the movements of the one shell can amount, with respect to the other shell, to twice the path at the same rotation or, in the case of counterrotating threads, the building shells can be moved against each other. Thus all possibilities are afforded. As many pipe sleeves as desired can be put on such a spindle with driving pins which are insertable into the spindles and which engage in longitudinal slots of the pipe lengths. A spindle with partition walls arranged thereon can also be provided on the opposite left-hand side of the shell 101 in the same manner by lengthening the foot 111a. In this way, any desired number of partition walls and shells can be brought into the predetermined arrangement and their parallel position with respect to each other assured.

Figure 7:
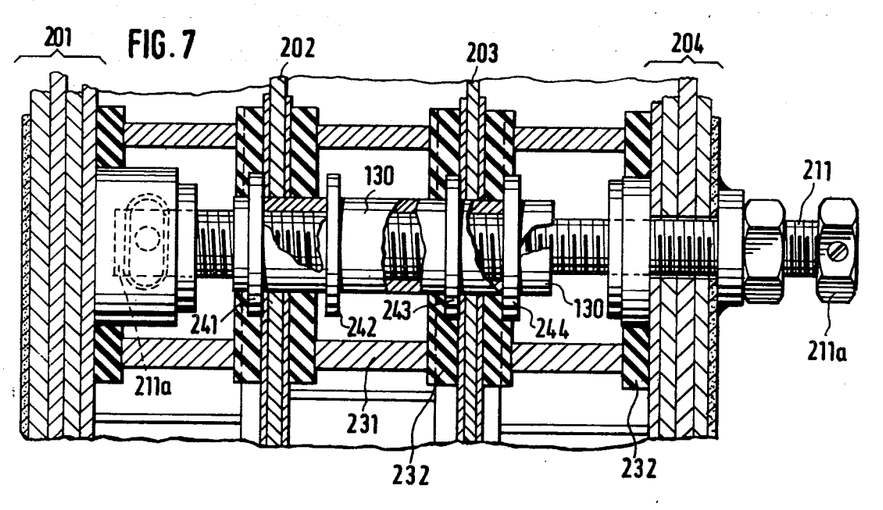
FIG. 7 is a modification of the screw assembly of FIG. 6.

FIG. 7 shows a variant of FIG. 6. In this form the foot 211a of the spindle 211 is mounted rotatable with a ring 220 in a housing 221 in a shell 201, with the ring being detachably fastened by a transverse screw 222. The spindle 211 bears threads with different pitches. On the thread, there is arranged a pipe length 130 with internal mating threads, having four driving disks 241, 242, 243, 244, and two partition walls 202, 203 arranged between. These driving disks can be fastened detachably on the transverse screws which engage in grooves on the pipe lengths or are otherwise attached in the intended position after arrangement of the partition walls 202, 203. If it is necessary to widen the intermediate space from the building shell 202 to the building shell 201 by 5 mm., e.g., in order to effect the evacuation of the air, the building shell 203 must be displaced by 10 mm. in order to obtain a change in position of 5 mm. with respect to the building shell 202. The building shell 203 must in addition, for the widening of its own hollow space, be removed by a further 5 mm., for a total of 15 mm. from its original position. Accordingly, the driver disk 241 in its starting position is at a distance of 10 mm. from the position of the building shell 202 on the screwed-on pipe length 130, and a return disk 242 is fastened on the pipe length 130 at a distance of 15 mm. from said driver disk 241. The driver disk 243, on the other hand, is in its basic position only 5 mm. from the partition wall 203 and the corresponding return disk 244 rests against the partition wall 203. If the pipe length 130 is moved from left to right by the movement of the "endless screw", then, after passing over a distance of 5 mm. the disk 243 will contact the partition wall 203 and will shift the same by 10 mm.

The driver disk 241, on the other hand, comes into contact with the partition wall 202 only after a path of 10 mm. of the pipe length and can shift the partition wall only by 5 mm. There is thus obtained the required widening of the hollow spaces. The return disk 244 in this displaced position is only at a distance of 5 mm. from the partition wall. On the other hand, the return disk 242 is at a distance of 10 mm. from the partition wall 202. The original starting positions of the partition walls 202 and 203 are again assumed after the evacuation is completed. The outer shell 204, on the other hand, is not arranged on the pipe length but on the spindle 211, the shell having a counter-thread of its own. This thread within the range of movement of the shell 204 is cut with such a different pitch that, with the same number of revolutions of the spindle for displacement of the partition walls 202, 203, the outer shell 204 changes its position by a total of 15 mm. and thereby widens also by 5 mm. the hollow space between it and the partition wall 203 arranged in front of it for the purpose of evacuation.

Sleeves 231 are arranged around the spindle passages between highly elastic rubber rings 232 and assure an air- and vapor-tight closure of the spindle openings in addition to the other sealing disks and rings which are arranged directly on the perforations.

I claim:

1. A composite wall element comprising:
   (a) a vapor-tight insulating inner wall element, and supporting means within said inner wall element for providing said inner wall element with load bearing characteristics,
   (b) an outer wall element of cast material enclosing at least part of said inner wall element, and
   (c) a plurality of reinforcing means embedded in said cast outer wall element substantially entirely around said inner wall element, at least certain of said reinforcing means being bent and engaging other reinforcing means at at least two contact points spaced substantially from each other in such a manner as to prestress in tension said certain reinforcing means in said cast outer wall element, thereby to provide a composite wall element having increased load-bearing capacity substantially entirely around said inner wall element.

2. The composite wall element of claim 1, wherein said reinforcing means comprise reinforcing wires cast in said outer wall element in both vertical and horizontal directions and in such a manner that certain of said reinforcing wires are interconnected to other of said wires extending in a position generally normal to said certain wires thereby to provide a structurally interconnected and tensioned network of said reinforcing wires in said cast outer wall element.

3. The composite wall element of claim 1 wherein at least two of said reinforcing means are provided with curved end portions which extend around other of said reinforcing means so as to tension said at least two reinforcing means.

4. The composite wall element of claim 3 wherein said at least two reinforcing means are constructed and arranged so as to contact or extend around other reinforcing means at at least two contact points thereby to establish and maintain the tension in said at least two reinforcing means.

5. The composite wall element of claim 1 wherein said inner insulating wall element includes an outer continuous covering fitting tightly within said outer wall element, said covering being provided on its inner surface with means for vapor-tight sealing said covering, first spacer means lining the interior of said covering and said sealing means to impart the desired shape and rigidity to said covering, the inwardly facing surfaces of said spacing means being provided with reflecting means which reflect toward the inner cavity formed by said spacer means, a reflective foil positioned within said cavity and spaced from said reflecting means, a plurality of spaced, second spacer means positioned on either side of said reflective foil and extending between said foil and said reflecting means, said second spacer means forming radiation chambers, and passage means communicating the interior of said composite element with the exterior thereof whereby a supply of air may be admitted to and exhausted from said radiation chambers.

6. The composite wall element of claim 5, further including means for delivering to said inner insulating wall element dry air under superatmospheric pressure.

7. The composite wall element of claim 5, further including means for maintaining in said inner insulating wall element dry air under subatmospheric pressure.

8. The composite wall element of claim 5, in which said outer wall element is a concrete wall element, and said covering is of plastic material.

9. The composite wall element of claim 5, wherein said covering is of plastic material and said means for vapor-tight sealing said covering comprises a metallic reflective foil.

10. A composite wall element comprising:
    (a) a vapor-tight insulating inner wall element having side walls, and supporting means within said inner wall element for providing said inner wall element with load bearing characteristics,
    (b) an outer wall element of cast material enclosing at least part of said inner wall element, and
    (c) anchoring means connecting opposed walls of the outer wall element and extending through the composite wall element, said anchoring means extending air-tightly through the inner insulating wall element and the opposed parts of the outer wall element so as to increase the load-bearing capacity of the composite wall element, said anchoring means comprising male and female screw spindle members, the threaded end of said male member threadedly engaging the internally threaded end of said female member for relative adjustment, each screw spindle member having an outer flange mounted thereon non-rotatably for engaging the outer surface of said inner wall elememt, and inner flange members adjustably axially mounted on said screw spindle members for rotation therewith and for engaging the inner surfaces of said walls of said inner insulating element, said outer and inner flanges engaging both surfaces of said side walls of said inner insulating element for adjusting the distance between said side walls and the compressive loading placed on said inner wall element.

11. The composite wall element of claim 10 further including locking elements positioned on the exterior surface of said male screw spindle member, said locking elements being adapted to extend radially outwardly from the surface of said male screw member for preventing outward movement of said adjacent inner flange member after such member has been moved past a respective locking element.

12. The composite wall element of claim 10 further including a spacer sleeve extending between said inner flange members and engaging the inner face of said side walls of said inner element, said spacer sleeve extending over and enclosing the mated sections of said screw members and serving to seal the inner wall element in such area.

13. The composite wall element of claim 10 wherein said spindle screw members are formed with enlarged head portions at their outer ends for rotating the same, and further including sealing members positioned between said heads and said outer flange members, said sealing members serving to enclose the associated screw sections in such region and seal the same in said cast outer wall element.

14. The composite wall element of claim 10 further including a plurality of reinforcing means embedded in said cast outer wall element substantially entirely around said inner wall element, at least certain of said reinforcing means being bent and engaging other reinforcing means at at least two contact points in such a manner as to prestress in tension said certain reinforcing means in said cast outer wall element, thereby to provide a composite wall element having increased load-bearing capacity.

15. The composite wall element of claim 14 wherein said reinforcing means comprise reinforcing wires cast in said outer wall element in both vertical and horizontal directions and in such a manner that certain of said reinforcing wires are interconnected to other of said wires extending in a position generally normal to said certain wires thereby to provide a structurally interconnected and tensioned network of said reinforcing wires in said cast outer wall element.

16. The composite wall element of claim 15 wherein at least two of said reinforcing means are provided with curved end portions which extend around other of said reinforing means so as to tension said at least two reinforcing means.

17. The composite wall element of claim 16 wherein said at least two reinforcing means are constructed and arranged so as to contact or extend around other reinforcing means at at least two contact points thereby to establish and maintain the tension in said at least two reinforcing means.

* * * * *